G. W. WALKER.
GRATE BAR.
No. 10,296. Reissued Mar. 13, 1883.
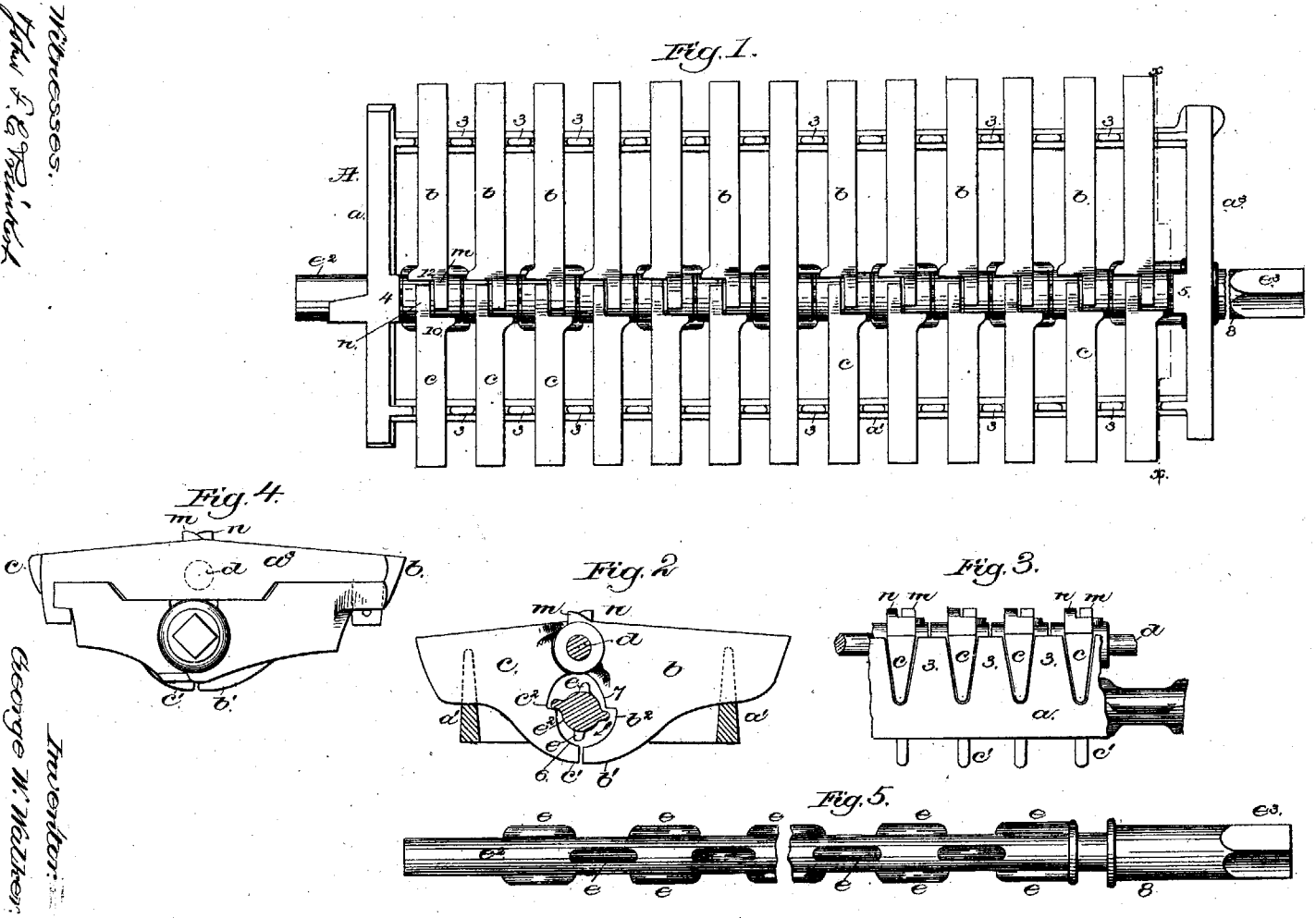
Witnesses.
John F. C. Prinkert
Fred A. Powell.
Inventor:
George W. Walker.
by Crosby & Gregory Attys
N. PETERS, Photo-Lithographer, Washington, D. C.

UNITED STATES PATENT OFFICE.

GEORGE W. WALKER, OF MALDEN, MASSACHUSETTS.

GRATE-BAR.

SPECIFICATION forming part of Reissued Letters Patent No. 10,296, dated March 13, 1883.

Original No. 246,645, dated September 6, 1881. Application for reissue filed February 2, 1883.

*To all whom it may concern:*

Be it known that I, GEORGE W. WALKER, of Malden, county of Middlesex, and State of Massachusetts, have invented a new and useful Improvement in Grate-Bars, of which the following description, in connection with the accompanying drawings, is a specification.

This invention relates to grate-bars, and is shown embodied in a dumping-grate.

The object of my invention is the production of a grate all the bars of which may be vibrated independently by cams, the said grate-bars being pivoted upon a rod supported in the dumping-frame at or near its center. Each grate-bar at its outer or movable end is guided by suitable combs or teeth forming part of the dumping-frame. The shaft which carries the cams for operating the grate-bars serves also as a supporting and trunnion shaft for the dumping-frame, thus making my improved grate-bar applicable to any furnace, in place of the usual grate-bar of substantially the same shape. Each of my improved grate-bars is extended only a part of the way across the dumping-frame, and is pivoted at its inner end, so that when a downward projection of the grate-bar is acted upon by a cam the outer end of the grate-bar will be raised and lowered rapidly. Adjacent grate-bars are provided with projections and shoulders to prevent the grate-bars leaving the notches or combs of the dumping-frame when the latter is turned over.

Figure 1 represents in top view a grate and dumping-frame embodying my invention; Fig. 2, a section on the dotted line $x\ x$, Fig. 1. Fig. 3 is a partial side elevation of the dumping-frame. Fig. 4 is a front end elevation of the dumping-frame, and Fig. 5 is a side elevation of the cam-shaft.

In the drawings, A represents the dumping-frame, it being oblong, the sides $a'$ of the frame being provided with a series of upright combs or fingers, 3, in the notches between which the series of grate-bars $b$ $c$, near their ends, are entered and guided. The grate-bars are each provided with a suitable hole to fit a rod, $d$, the end of which has suitable bearings in the end $a$ of the dumping-frame, and at one end is covered by a cap, $a^3$, secured to the front end of the dumping-frame, the projections 4 5 (see Fig. 1) extending over the said rod $d$ near its ends. The grate-bar $b$ has a downwardly-projecting finger or arm, $b'$, and the shoulder $b^2$, and each grate-bar $c$ has a corresponding downwardly-projecting arm or finger, $c'$, and the reversely-placed notch or shoulder $c^2$, these arms $b'$ and $c'$, below the pivotal point $d$ of the grate-bars, being suitably shaped to present proper cam-surfaces to be acted upon by short cam projections $e$, more or less in number, and arranged, as shown in Fig. 5, on the shaft $e^2$, the front end of which is squared, as at $e^3$, to receive the usual wrench or handle with which to rotate the said shaft $e^2$, to vibrate the grate-bars, and also to turn over the dumping-frame. As the shaft $e^2$ is rotated in the direction of the arrow, &c., Fig. 2, the cam projections will strike against the portions 6 of the grate-bars $c$ and the portions 7 of the grate-bars $b$, and will move them so as to elevate the outer ends of the grate-bars, and as the cams pass the shoulders $b^2$ $c^2$ the grate-bars, by their own gravity and the weight of the fuel upon them, will drop.

The left-hand end of the shaft $e^2$ serves as the journal for the dumping-frame, and the neck 8 of the right-hand end of the said shaft, (see Fig. 1,) which in practice will be from two to three inches in length, serves as a journal to fit a proper bearing to sustain the front part of the dumping-frame. When it is desired to tip over the dumping-frame, the shaft $e^2$ will be turned in the direction opposite the arrow, Fig. 2, when the cam projections $e$ will strike squarely against the shoulders $c^2$ and $b^2$, and will turn the dumping-frame over toward the left, as herein shown, the frame being capable of being turned over only in that direction. As described, it will be understood that this shaft $e^2$ serves the purpose of the journal for the dumping-frame, and is provided with cams by which to vibrate the grate-bars when the shaft is turned in one direction, and the grate-bars are so shaped that when the said shaft is turned in the opposite direction the cams thereon, operating against the shoulders of the grate-bars, will turn the dumping-frame over.

Each grate-bar $b$ has a projection, $m$, to strike against a shoulder, 10, of the grate-bar $c$ in line with it, and each grate-bar $c$ has a similar projection, $n$, to engage a shoulder, 12, of the grate-bar $b$ in line with it, so that when the dumping-frame is turned over the said projections meet the said shoulders and prevent the grate-bars turning so far upon the rod *c* as to permit the ends of the grate-bars to leave the notches between the fingers or projections 3 of the dumping-frame A.

The cap $a^3$, at the front end of the dumping-frame, serves as a cover to retain the shaft $e^2$ in its bearing in the dumping-frame. This cap $a^3$, as shown in Fig. 4, is hooked at one end to engage a lug, *f*, of the dumping-frame, and at its other end the cap has a leg to enter a socket of the dumping-frame, the leg being secured in the said socket by means of a pin, *o*, extended therethrough, as shown in the said figure.

These grate-bars, fixed at their inner ends substantially at or near the longitudinal center of the dumping-frame, are vibrated up and down at their outer ends, moving only at the said outer ends.

I do not broadly claim a grate-bar mounted loosely in a dumping-frame, so that each end of the grate-bar may be moved up and down by means of cams on an independent shaft other than that which serves as the journals for the dumping-frame.

I claim—

1. The combination, with the frame, of grate-bars *b c*, pivoted at their inner ends, and a cam-shaft to operate upon downwardly-extended portions of and vibrate the said grate-bars about their pivotal point, substantially as described.

2. The pivoted grate-bar provided with a downwardly-projecting arm, shouldered as described, combined with a dumping-frame and with a cam-shaft which, turned in one direction, will vibrate the said grate-bar, and in the other direction will turn over the dumping-frame, substantially as described.

3. The dumping-frame provided with the fingers or projections 3 to receive the grate-bars, combined with the independent grate-bars *b c*, having their inner ends pivoted substantially at the center of the dumping-frame, as set forth.

4. The frame, its rod *d*, and the series of grate-bars *b c*, the bars *b* being substantially in line with the series of grate-bars *c*, one grate-bar *b* being at one side of the frame, while a grate-bar *c* is at the opposite side of the frame, in line with it, substantially as described.

5. The dumping-frame, its cam-shaft, and rod *d*, combined with the series of grate-bars *b c*, provided with projections *m n* and shoulders 12 10, to operate substantially as described.

6. The dumping-frame and a series of grate-bars mounted thereon, combined with a shaft adapted to serve as the journal for the dumping-frame, and provided with cams to operate the grate-bars, substantially as described.

7. A dumping-frame having a series of independently-movable grate-bars mounted thereon, combined with a cam-shaft which both actuates the grate-bars and serves as the journal for the dumping-frame, the same shaft when rotated in one direction operating only the grate-bars on the dumping-frame, and in the other direction turning the dumping-frame.

8. The dumping-frame combined with the cam-shaft to actuate the grate-bars, the said shaft being arranged to serve as the journals about which the said frame may be turned when it is desired to dump the same.

9. The dumping-frame and the cam-shaft to support it, combined with a series of movable grate-bars having curved surfaces, against which the cams act in one direction of the shaft to move the grate-bars, and with shoulders against which the cams of the cam-shaft act when the latter is rotated in an opposite direction to dump the dumping-frame, substantially as described.

GEO. W. WALKER.

Witnesses:
G. W. GREGORY,
B. J. NOYES.